US005770135A

United States Patent [19]

Hobbs et al.

[11] Patent Number: 5,770,135
[45] Date of Patent: Jun. 23, 1998

[54] PROCESS FOR PRODUCING PERMEATION RESISTANT CONTAINERS

[75] Inventors: John Peter Hobbs, Landsdale; James Francis DeiTos, Emmaus; Madhu Anand, Allentown, all of Pa.

[73] Assignee: Air Products and Chemicals, Inc., Allentown, Pa.

[21] Appl. No.: 673,989

[22] Filed: Jul. 1, 1996

[51] Int. Cl.$^6$ .................................................. B29C 49/46
[52] U.S. Cl. .......................... 264/83; 264/526; 264/528; 427/237
[58] Field of Search ............................ 264/83, 526, 528; 427/237, 248.1, 255.1

[56] References Cited

U.S. PATENT DOCUMENTS

| | | | |
|---|---|---|---|
| 3,862,284 | 1/1975 | Dixon et al. | 264/83 |
| 3,992,221 | 11/1976 | Homsy et al. | 264/83 |
| 4,701,290 | 10/1987 | Eschwey et al. | 264/40.1 |
| 4,869,859 | 9/1989 | Eschwey et al. | 264/83 |
| 4,902,529 | 2/1990 | Rebban et al. | 427/237 |
| 5,073,231 | 12/1991 | Eschwey et al. | 156/646 |
| 5,147,724 | 9/1992 | Eschwey et al. | 428/409 |
| 5,244,615 | 9/1993 | Hobbs | 264/83 |
| 5,401,451 | 3/1995 | Meixner et al. | 264/83 |

FOREIGN PATENT DOCUMENTS

| | | | |
|---|---|---|---|
| 3535602 | 10/1985 | Germany | 264/83 |

*Primary Examiner*—Catherine Timm
*Attorney, Agent, or Firm*—Russell L. Brewer

[57] ABSTRACT

The present invention discloses an improved process for producing plastic containers with excellent resistance to permeation by solvents such as hydrocarbons, hydrocarbon fuels, and hydrocarbon fuels with organic additives including lower alkanols and ethers consistently and reliably. The process is related to a treatment of plastic containers in a controlled manner with fluorine containing gases while blow molding them. In the process of the present invention, an article of manufacture, a container, is formed and subjected to fluorination by exposure to a fluorination gas. After the fluorination, the container is quenched by exposing the container to a fluorine reactive gas to react with the fluorine, thereby converting the fluorine to a less reactive gas.

17 Claims, No Drawings

PROCESS FOR PRODUCING PERMEATION RESISTANT CONTAINERS

TECHNICAL FIELD OF THE INVENTION

This invention relates to a process for producing permeation resistant containers.

BACKGROUND OF THE INVENTION

Fluorination of polyethylene and other polymeric materials to improve their resistance to solvents and to vapor permeation has long been practiced. Dixon et al. in U.S. Pat. No. 3,862,284 was one of the first to produce barrier resistant fluorinated containers. A treatment gas containing from about 0.1 to 10% by volume of fluorine in an inert gas was injected into the parison to inflate or expand it into shape. Due to the higher temperature, a combined blowing and reaction time of approximately 5 seconds was utilized at which time the parison was cooled and the reactive gas and container recovered.

Commercially fuel tanks having enhanced resistance to hydrocarbon permeation have been marketed under the Airopak trademark wherein the fuel tanks are produced by utilizing blow molding techniques. In these processes the parison is initially conformed to the desired shape by inflating or expanding with an inert gas, followed by purging of the parison and subsequent injection of the parison with a reactive gas containing from 0.1 to 10% fluorine. The reactive gas is removed from the parison, recovered and the container ejected from the mold.

There have been substantial modifications to the early processes for the production of containers having enhanced barrier properties via blow molding. Some of the processes are described in the following patents:

U.S. Pat. No. 4,701,290 discloses the production of high density polyethylene fuel tanks having increased barrier resistance to hydrocarbon solvent and vapor permeation via off-line fluorination. The key to enhancing barrier permeation resistance lies in the precise control of fluorination of the polyethylene fuel tank and this is achieved by passing the treatment gas through a container filled with aluminum oxide. By measuring the quantity of oxygen generated from the $Al_2O_3$, one controls the concentration of fluorine contained in the treatment gas and thereby controls the level of fluorine acting upon the surface of the container within a predefined reaction time.

U.S. Pat. Nos. 5,073,231 and 5,147,724 disclose a fluorination process for producing plastic objects with a smooth surface finish. According to these patents, smooth surfaces are produced by treating plastic objects, preferably at elevated temperatures, with a mixture of fluorine and an oxidizing agent, preferably oxygen. Fluorinated surfaces thus produced are claimed to (1) incorporate very low fluorine in the plastic (less than 6 $mg/cm^2$) (2) are glossy and (3) provide good barrier action against non-polar solvents.

U.S. Pat. No. 4,869,859 discloses a blow molding process for the preparation of high density polyolefin fuel tanks. The patentees indicate that severe wrinkling of the thermoplastic occurs at temperatures close to or above the melting point, causing an increase in the permeation rate of the solvent. According to this patent, fluorination is carried out at temperatures from 50° to 130° C., preferably 80° to 120° C., and below the melting temperature of the polymer, in an effort to achieve uniform temperature distribution and fluorination of the interior surface of the material.

U.S. Pat. Nos. 5,244,615 and 5,401,451 disclose a multi-step blow molding process for producing permeation resistant thermoplastic containers. A thermoplastic parison is expanded within a closed mold by means of an inert gas, the parison vented and then treated with a reactive gas containing 0.1 to 1% fluorine by volume while the parison is at a temperature above its self supporting temperature for a time sufficient to effect fluorination of the interior surface of the parison. Subsequently, the interior surface of the pre-fluorinated parison is treated with a reactive gas containing at least twice the initial concentration but not less than about 1% fluorine by volume for a specified time to form the fluorinated parison with increased permeation resistance. Oxygen control is emphasized in the '451 patent.

U.S. Pat. Nos. 5,073,231 and 5,147,724 discloses the production of plastic objects having a smooth and glossy surface and are also resistant to organic fluids. The plastic articles, typically polyolefins, are contacted with a gaseous mixture of fluorine and oxygen or other oxidizing agent.

SUMMARY OF THE INVENTION

This invention relates to an improvement in a fluorination process for the preparation of thermoplastic containers such as fuel tanks and bottles. The containers have excellent barrier properties with respect to organic liquids and to vapor permeation, Examples include polar liquids, hydrocarbon fuels, and hydrocarbon fuels containing polar liquids such as alcohols, ethers, amines, carboxylic acids, ketones, etc. The basic process for producing thermoplastic articles having excellent solvent barrier properties resides in (1) forming a container of thermoplastic material within a mold and (2) fluorinating the container with a reactive gas fluorine container. In a blow molding process, for example, the reactive gas generally will contain from about 0.5 to 2% fluorine by volume, and fluorination is effected while the thermoplastic is at a temperature above its self-supporting temperature for a time sufficient to effect fluorination of the surface. Subsequent to the fluorination, the parison or container is purged of the residuary fluorine. The improvement in the basic process resides in quenching the residuary fluorine from the container by introducing a fluorine scavenging gas under conditions for converting any residual fluorine gas to a fluoride and less reactive component and then evacuating the container. A preferred fluorine scavenger is hydrogen. Hydrogen may also be used to treat the container prior to fluorination to provide enhanced results.

There are several advantages associated with the fluorination process to produce containers having improved barrier properties, and these include:

the ability to form permeation-resistant containers having enhanced barrier properties, particularly with respect to hydrocarbons, polar liquids and hydrocarbons containing polar liquids such as alcohols, ethers, amines, carboxylic acids, ketones, etc.;

the ability to reduce worker exposure to the residual, toxic halogen gas from the article, its surface and/or the treatment environment; and the ability to enhance production rate particularly in a blow molding process due to the reduced time required for removal of the residual fluorine.

the ability to produce plastic surfaces having a high level of gloss without incorporation of high levels of oxygen.

DETAILED DESCRIPTION OF THE INVENTION

Molding of thermoplastic materials to produce containers of various sizes, wall thicknesses and shapes is well known. Thermoplastic material such as polymers and copolymers of polystyrene, polyacrylonitrile, polyvinyl chloride and particularly polyolefins such as low density and high density polyethylene and polypropylene often are used in producing containers and they can be treated via off-line or in-line fluorination methods to enhance their solvent barrier properties. Thick-walled containers, e.g., 4 millimeters (mm) and greater, typically 4 to about 6 mm high density polyethylene for the fabrication of fuel tanks and component parts for the automotive industry and thin-walled, e.g., 3 mm and less wall thickness, bottle-type containers.

In a typical in-line blow molding process for producing hollow articles or containers, for example, a thermoplastic material is heated to a temperature above its softening point, formed into a parison and confined within a mold. The parison is inflated or expanded in its softened or molten state via sufficient pressurization with a gas to conform the parison to the contour of the mold. In many processes, fluorine-containing gases initially are used to inflate and conform the parison to the contour of the mold. In recent years, the parison initially has been conformed to the mold via pressurization with a substantially inert gas, e.g., nitrogen, helium, or argon, to ensure that a seal is formed, then fluorinated in an effort to reduce environmental contamination and occupational hazards.

Preferably an in-line, multi-fluorination step process is used for fluorinating fuel tanks and thin-walled bottle type polymer containers for producing containers having an excellent barrier to hydrocarbon solvents containing polar liquids and other organic materials. The process involves carefully controlling the polymer temperature, the concentration of fluorine and oxygen in the reactive gas used during fluorination of the parison and controlling the contact time of fluorination. In this type of process, the parison is evacuated or purged, inflated and initially contacted with a reactive gas containing a low concentration of fluorine (0.05 to 0.5% by volume, and preferably 0.2 to 0.4%), the balance thereof being inert under the reaction conditions, at a temperature above the self-supporting temperature of the thermoplastic and for a time sufficient to effect surface fluorination. This usually requires from about 2 to 60 seconds, preferably 5 to 45 seconds. The self-supporting temperature is defined as the temperature above which the parison or container will collapse if removed from the mold. A low concentration of fluorine is selected for the initial fluorination step because the use of a high concentration of fluorine while the polymer is at a temperature above the self-supporting temperature is believed to damage the polymer surface, thereby reducing its barrier properties. The pre-fluorinated parison is then contacted with a fluorine-containing reactive gas typically containing a relatively high concentration of fluorine (greater than 0.3, preferably greater than 0.7 and up to about 2% by volume) in subsequent steps to further fluorinate the polymer without causing damage to the polymer surface. Typically, the fluorine concentration will range from 0.7 to 1.6%. Excessive localized heating is believed to be reduced since many of the available reactive sites are reacted with fluorine in the initial treatment and because the surface temperature of the pre-fluorinated parison is reduced on contact with the ambient temperature gas.

In a preferred multi-step in-line process, one carefully purges the parison and inert gas and reactive gas feed lines prior to fluorination to reduce the oxygen contaminant level below about 50 ppm in the parison prior to fluorination. By keeping the oxygen concentration low, the desired O/C ratio in the fluorinated layer is maintained. One way to verify the effectiveness of the purging process for the removal of oxygen is by analyzing the exhaust gas from a purged nonfluorinated parison or by analyzing the fluorinated surface of containers with respect to the oxygen/carbon ratio. Another way is to add an oxygen scavenging gas, e.g., hydrogen. That is preferred. If the ratio of oxygen to carbon in the fluorinated layer is 0.08 or above, then the process may require additional purging of the gas feed lines. With a reduction in oxygen contamination, the concentration of fluorine in the reactive gas for the first and subsequent fluorination treatment steps can be reduced vis-à-vis fluorination in an oxygen contaminated atmosphere. It can be controlled in such a way that it eliminates both under and over fluorination of the inside surface of the treated parison.

Containers may also be prepared in an off-line or post-mold fluorination process. In this method, the containers are formed within a mold and removed for subsequent fluorination. Fluorination is effected similarly to that in a blow molding process in that at least the interior surface of the container is exposed to a fluorine-containing gas for a time sufficient to effect surface fluorination. Subsequent to fluorination, the fluorine gas is removed.

One of the problems associated with the halogen or fluorine treatment of polymeric materials to enhance their barrier properties is that bromine, chlorine, fluorine, iodine and the inter-halogen compounds are all highly toxic substances, having government regulated air contaminant exposure limits as established by OSHA, Title 29 code of federal regulations part 1910.1000. The high toxicity of the halogens, particularly fluorine, raises a safety concern. In order to minimize worker exposure extensive purging of the treated article or container surface or treatment chamber is required to reduce the toxic concentrations to acceptable levels. Hydrogen halides, for example, while also potentially toxic, have government regulated exposure limits which are less stringent and reflect their lower toxicity.

It has been found that the problem of residual fluorine in the purge gas can be overcome by purging the container with at least a stoichiometric amount of a fluorine scavenging gas. The fluorine reactive gas preferably is a hydrogen donating gas, e.g., one capable of donating hydrogen atoms. Not only can the toxicity problem of residual fluorine be reduced, it has been found that the barrier properties of the container can be enhanced through the use of a scavenging gas, particularly hydrogen. The fluorine scavenging species is one which can contain one or more reactive hydrogens or multiple bonds that will react with the residual fluorine to convert it into the less toxic hydrogen halide. If the fluorine scavenging species is also one which reacts or combines with surface reactive sites so as to render them inert to further reaction, barrier properties can be enhanced. Most preferably, the halogen and specifically fluorine scavenging species, will have a rapid diffusion into the surface of the article so as to neutralize dissolved fluorine and buried reactive sites. The fluorine scavenging species which can react with fluorine to form the non-toxic or lower toxicity products include sulfur tetrafluoride, sulfur dioxide, sulfur hexafluoride, sulfuryl fluoride, ammonia, ammonium fluoride, hydrocarbons such as methane, ethane, ethylene and hydrogen. Typically, the scavenging gas will comprise from about 0.1 to 10% of the fluorine reactive gas and the balance being an inert gas such as nitrogen. Expressed another way the partial pressure of fluorine scavenging gas will range from 0.1 to 600 millibars and the balance being an inert gas. Other inert gases include carbon dioxide, argon and helium. Typically, the quantity of the scavenging gas used will comprise at least a stoichiometric quantity relative to the residual fluorine. Hydrogen is the preferred scavenging gas because of its reactivity and the diffusivity into the fluorinated thermoplastic polymer. The quench gases also serve another function in that the gases may be used for cooling the container prior to removal from the mold.

Subsequent to quenching of the fluorine in the parison or container and conversion of residual fluorine to fluoride, the halogen treatment gas or fluorine scavenging gas may be recovered from one process cycle to another. The purge gases containing fluorides which are less toxic than fluorine still must be scrubbed to prevent or reduce the discharge into the atmosphere. When the halogen is chlorine or fluorine, one industrially accepted practice is to neutralize the purge gas in a liquid caustic scrubber. Such scrubbers are operated at strongly caustic concentrations of 8 to 22 wt % KOH (potassium hydroxide) to ensure destruction of the halogen, and to prevent the formation of $OF_2$ (oxygen difluoride) in the case of fluorine. These conditions also result in the scrubbing of $CO_2$ (carbon dioxide) from the gas stream.

When using hydrogen for scavenging residual fluorine, the resultant by-product gas stream, can be neutralized in a slightly alkaline water scrubber. The waste stream of a water based hydrogen halide scrubber may be safely disposed of by sewering. The by-product gas resulting from hydrogen purging of a fluorine treatment gas also can be scrubbed by passing it through a potassium fluoride bed, the resultant solid by-product being useful in the manufacture of fluorine.

The following examples are provided to illustrate various embodiments of the invention and are not intended to restrict the scope thereof. All gas concentration percentages are expressed as volume percent.

EXAMPLE 1

Effect of Quenching with Fluorine Reactive Gas on Process Cycle Time Using Nitrogen Purge and Hydrogen Scavenging The impact of quenching fluorine in an situ fluorination treatment process was determined by exposing a container to a 1 volume percent fluorine in nitrogen. At the end of the fluorination exposure the pressure in the container is relieved to 2 bar (1 atmosphere gauge pressure), then purged of residual fluorine by repeated pressurizations. One set of purgings was effected with a high purity inert purge gas, such as nitrogen, to 10 bar followed by pressure release to 2 bar and another set purged with the scavenging gas, hydrogen. Even with perfect mixing of the gases within the container on each cycle, 8 such purge cycles are required in the conventional method for the concentration of fluorine in the container to drop below a 0.1 ppm level. On the other hand by performing one or more of the first purge cycle pressurizations using a scavenger gas mixture, such as 0.5 volume % hydrogen in nitrogen, the number of cycles required to reduce the toxic fluorine gas concentration to a similar worker exposure level is reduced to 6. Sufficient hydrogen had been added through the pressurizations to react with the fluorine.

In the manufacture of thick walled plastic containers, such as fuel tanks, by in situ fluorination the above calculated reduction in purge cycles can result in an approximately 32 second reduction in the 4 minute cycle time. Expressed another way, that amounts to a 15.4% increase in productivity. Additionally one or more of the purge cycles following the purge(s) with the scavenger gas can now be performed using a purge gas contaminated with oxygen, such as pressure swing adsorption (PSA) grade nitrogen, or air, instead of requiring high purity nitrogen. It would even be possible to prepare the fluorine scavenging gas from PSA grade nitrogen through the use of a hydrogen deoxygenation unit which was over-supplied with hydrogen.

EXAMPLE 2

Effect of Scavenging Fluorine with a Fluorine Reactive Gas on Cycle Time in Off-Line Fluoridation, Fluoro-Chlorination and Fluoro-Chloro-Oxidation Process The effect of quenching techniques in a fluorination, a fluoro-chlorination or a fluoro-chloro-oxidation treatment process wherein previously fabricated containers are exposed at ambient temperatures and pressures to an atmosphere containing 1.25 volume percent fluorine, 11 volume percent chlorine, and 11.6 volume percent oxygen and the balance being nitrogen. In the process, the treatment gas is removed by evacuation down to 0.1 bar pressure and the chamber purged repeatedly. In one case the chamber is filled with air up to 1 bar and then the chamber is evacuated to 0.1 bar. This process is compared to a process where one or more of the first purge cycles is effected with a scavenger gas consisting of 4 volume % hydrogen. The number of cycles can be reduced to 5 from 6 with all other parameter being the same.

Additionally, in both Examples 1 and 2, the resultant fluoride by-products in the scavenger gas reaction are more easily scrubbed than the fluorine treatment gases, permitting one to use a scrubber of lower caustic concentration, which would not scrub $CO_2$ from the gas stream, thereby improving the efficiency of the scrubber unit, and reducing or eliminating the hazardous waste being produced.

EXAMPLE 3

Effect of Nitrogen and Hydrogen Quench of Fluorinated Parison on Purge Gas Toxicity and Barrier Resistance in Blow Molding Process Several 16 ounce containers were blow molded by extruding a hollow molten tube (parison) of high density polyethylene (HDPE) while purging the interior of the tube with sufficient nitrogen to reduce the interior oxygen concentration (calculated to be substantially less than 1,000 PPM). The molten parison was inflated with a fluorine gas consisting of 1 volume % fluorine in a nitrogen blend at 7.8 bar for 10 seconds under conditions such that the exterior surface of the plastic was forced into contact with a temperature controlled mold, held at 40.5° C. After this fluorination treatment, the containers were vented to atmospheric pressure and the containers purged by pressurizing them with a purge gas to approximately 7 bar and then venting to atmospheric pressure. This purge cycle was repeated 4 more times (approximately 2.5 seconds per purge cycle). The quench gas consisted of (1) nitrogen containing substantially no oxygen contamination (N), (2) 4 volume % percent deuterium (H) in nitrogen and (3) 0.1 volume % oxygen (O) in nitrogen. When the final purge gas was vented, the mold was opened, the container removed and placed on a post fabrication purging apparatus. The interior of the container was purged with a stream of room air at atmospheric pressure until no residual fluorine or hydrogen fluoride could be detected.

The residual gas in the containers which had been purged with (1) nitrogen and (3) nitrogen containing 0.1 volume % oxygen had a distinct pungent odor of fluorine. The residual gas in the containers which had been purged with (2) nitrogen containing deuterium did not display this pungent odor, but did contain a sharp smell which was identified as coming from hydrogen fluoride.

The barrier properties of the container were determined by filling the containers with approximately 400 grams of a mixture of 15 volume % methanol in toluene mixture, sealing the containers, storing them in an air circulating oven at 50° C. and measuring the container weight loss over 28 days. The fluorinated barrier surface elemental composition was assessed by performing ESCA analysis. The results are given in Table 1 below.

TABLE 1

| Quench Treatment (5 purge cycles) | Weight Loss (grams) | Relative Permeation | ESCA Carbon | Fluorine | Oxygen |
|---|---|---|---|---|---|
| no treatment | >125 | | | | |
| N—N—N—N—N | 13.4 | 100% | 43% | 52.1% | 4.1% |
| O—O—O—O—O | 13.6 | 101.5% | 41.1 | 55.7 | 3.2 |
| O—O—H—H—O | 12.5 | 93.3% | 41.9 | 55.1 | 3.0 |
| H—H—O—O—O | 9.9 | 73.9% | 41.9 | 55.5 | 2.6 |
| H—H—N—N—N | 9.0 | 67.2% | 42.4 | 54.8 | 2.8 |

Quench Treatment:
H represents a purge cycle with 4 volume percent (vol %) deuterium in nitrogen,
N represents a purge cycle with nitrogen (<10 PPM oxygen),
O represents a purge cycle with 0.1 vol % oxygen in nitrogen.

The above results show in situ fluorination treatment followed by purging with an inert gas (1) to remove the fluorine, as described in the prior art by Dixon et al. in U.S. Pat. No. 3,862,284 compared to oxygen (2) and fluorine scavenging gas quenches (3). Replacing some of these low level oxygen purge cycles using a halogen scavenging gas, i.e., hydrogen can improve the container's barrier performance, even relative to the non-oxygen exposed performance. Truly superior performance occurs when there is fluorine reactive quenching via a hydrogen purge preceding exposure of the container to oxygen.

EXAMPLE 4

Effect of Hydrogen and Oxygen Free Quench to Remove Residual Fluorine in Thick Walled Containers Several 16 ounce HDPE containers were blow molded as in Example 3; however, the fluorine inflation was effected with a gas mixture consisting of 1 volume % fluorine in nitrogen at 8.8 bar for either 6 or 36 seconds. The mold was held at 110° C. so that the interior surface of the container might approximate the temperatures experienced in the blow molding of thick walled plastic containers such as fuel tanks. After this fluorination treatment the containers were vented to atmospheric pressure. The containers were purged by pressurizing them with a purge gas to approximately 7 bar and venting to atmospheric pressure. This purge cycle was repeated 15 times for the 6 second fluorinations and 10 times for the 36 second fluorinations (approximately 7.5 seconds per purge cycle). The purge gases used were (1) uncontaminated (N), (2) 4 volume % percent deuterium (H) in nitrogen and (3) 2 volume % oxygen (O) in nitrogen. When the final purge was complete, the mold was opened and the container placed on a post fabrication purging apparatus. The interior of the container was swept with a stream of room air at atmospheric pressure until no residual fluorine or hydrogen fluoride could be detected.

Upon removal from the mold, the residual gas in the containers which had been purged without being exposed to the fluorine scavenging gas, hydrogen, had a minor odor of fluorine or hydrogen fluoride. The residual gas in the containers which had been purged with the deuterium containing nitrogen (2) did not display this odor at all, but smelled only of hot plastic. The quality of the resultant barrier to methanol in toluene was determined. The results are given in Table 2 below.

TABLE 2

| Fluorination Time | Quench Treatment Initial | Purge Treatment Subsequent | Weight Loss (grams) | Relative Permeation |
|---|---|---|---|---|
| untreated | | | >125 | |
| 6 sec | | 15 × N | 108.9 | 100% |
| 6 sec | | 15 × O | 109.2 | 100.3% |
| 6 sec | H | 14 × O | 73.7 | 67.7% |
| 36 sec | | 10 × O | 55.1 | 50.6% |
| 36 sec | H—H | 8 × O | 40.1 | 36.8% |

This example shows that performing in situ fluorination under conditions similar to those used in the fabrication of plastic fuel tanks, followed by purging with (a) an oxygen containing gas or (b) purging with an oxygen-free gas while exposing the still hot polymer surface to air produces a container with an inferior barrier performance to alcohol containing hydrocarbon mixtures. Replacing the initial purge consisting of an oxygen containing purge cycle with a hydrogen quench cycle improves the container's barrier performance, even though the container is subsequently exposed to these high levels of oxygen. Even extending the exposure time to the fluorination gas, while improving the performance, does not eliminate the positive benefit from the use of the fluorine scavenging gas.

EXAMPLE 5

Effect of Hydrogen Purge and Hydrogen Quench on Barrier Resistance in Two-Stage Fluorination Several 16 ounce HDPE containers were prepared as in Example 3. Some of the parison were initially purged with (1) nitrogen (N) having oxygen contamination levels calculated as being less than 1000 PPM, (2) 3.84 volume % hydrogen in nitrogen blend (H2), and (3) air, some were not purged and allowed to fill with air. The containers were blow molded by inflating the molten parison with a fluorine in nitrogen blend at 7.1 bar for 4.75 seconds, such that the exterior surface of the plastic was forced into contact with a temperature controlled mold, held at approximately 40° C. After the fluorination treatment the containers were vented to atmospheric pressure, then the containers were either exposed to a second higher concentration of fluorine, or purged. Purging was done by pressurizing the containers with a purge gas to approximately 7 bar and venting them to atmospheric pressure. The purge cycle was repeated twice for the containers exposed to one fluorine concentration and once for containers exposed to two fluorine concentrations (approximately 6 seconds per cycle). The purge gases used were (1) nitrogen containing either substantially no oxygen contamination (N), or (2) 1 volume % percent hydrogen (H) in nitrogen. When the final purge pressure was vented, the mold was opened, the container was removed and further purged as described in Example 3. In some cases the containers were pre-blown with nitrogen or the 1% hydrogen mixture and vented, prior to their inflation with fluorine.

Upon removal from the mold, the residual gas in the containers which had been purged with nitrogen had the distinct pungent odor of fluorine. The residual gas in the containers which had been purged with hydrogen containing nitrogen displayed only the odor of hydrogen fluoride. The quality of the resultant barriers were determined as in Example 3. The surfaces of the containers were analyzed using ESCA to determine the surface atomic composition. The results are listed in Table 3 below.

the barrier performance of containers obtained from post fluorination purging with the fluorine scavenging gas, hydrogen, under these conditions, where the performance was already improved through the pre-fluorination treatment, and the containers were scrupulously protected from oxygen following fluorination.

TABLE 3

| Run | Parison Purge | Preblow | First Fluorine | Second Fluorine | Purge | 28 day Permeation | Relative Permeation | ESCA Carbon | Fluorine | Oxygen |
|---|---|---|---|---|---|---|---|---|---|---|
| 1 | Air | None | 1% | None | N | 117.2 gram | 345% | 49.6% | 30.9% | 18.3% |
| 2 | N | None | 1% | None | N | 34.0 | 100% | 40.1 | 57.9 | 2.0 |
| 3 | H2 | None | 1% | None | N | 27.7 ± 0.9 | 81.5% | 41.8 | 55.8 | 2.4 |
| 4 | N | None | 1% | 10% | N | 8.9 | 100% | 40.0 | 58.2 | 1.8 |
| 5 | H2 | None | 1% | 10% | N | 7.8 | 87.6% | | | |
| 6 | H2 | N | 1% | 10% | N | 11.3 | 127% | 43.9 | 53.9 | 2.2 |
| 7 | H2 | H | 1% | 10% | H | 7.2 | 80.9% | 43.9 | 53.1 | 3.0 |
| 8 | H2 | None | 1% | None | H | 29.1 ± 1.3 | 85.6% | 42.2 | 54.6 | 3.2 |

This example shows the effect of both a hydrogen purge of the parison before fluorination and a hydrogen quench after fluorination (Run 7). The use of hydrogen eliminates residual fluorine in the purge gas to a less reactive gas and reduces resultant toxicity. Regarding permeation, Runs 1, 2 and 3 in Table 3 show that using an inert purge gas alone does substantially improve the barrier performance. Using the fluorine scrubbing gas, viz. a hydrogen-containing purge gas, further improves the quality of the resultant fluorinated container for containing hydrocarbon mixtures with polar components like alcohols. Runs 4 and 5 confirm this to be also true for multiple step progressive fluorination processes. The ESCA results indicate that, in this instance, the improved performance resulting from the use of the halogen scavenging purge gas is not the total result of suppression of the oxygen uptake by the barrier surface.

The permeation results for Run 6, when compared with those for Runs 4 and 5, show that using a further inert gas inflation step prior to fluorination does not improve the resultant performance, while the results for Run 7 indicate that the performance can be further improved by incorporating such a step using a reactive, free radical/halogen scavenging pre-treatment gas, hydrogen. The permeation results from Run 8, which could not be statistically differentiated from those for Run 4, show essentially no change in EXAMPLE 6
Effect of Quench in Temperature Controlled Mold For Producing Thin-Walled Containers Several 16 ounce HDPE containers were prepared as in Example 3. The containers were blow molded by inflating the molten parison, such that the exterior surface of the plastic was forced into contact with a temperature controlled mold, held at approximately 10° C. The inflation gas used was 1 volume % fluorine in nitrogen containing less than 5 PPM of oxygen. The fluorine inflation at approximately 7.5 bar and hold time was 6 seconds. After the fluorination treatment, purging of the containers was done using 3 purge cycles of (1) oxygen in nitrogen blends, or (2) a 4% hydrogen in nitrogen blend. The quench cycle inflation and hold time was 6 seconds. A 1.5 second exhaust time was used after each gas exposure. After the final quench, the containers were vented to atmospheric pressure, the mold opened, the container removed and further purged as described in Example 3.

The quality of the resultant barriers was determined as in Example 3, however, the solvent used was 3.3 moles/liter methanol, 0.6 moles per liter ethanol and 0.7 moles per liter water in a 30%/70% blend of toluene and hexane. Containers were also tested using a 30%/70% blend of toluene and hexane without alcohols. The surfaces of the containers were analyzed using ESCA to determine the surface atomic composition. The results are listed in Table 4 below.

TABLE 4

| Run | Purge Gas Oxygen PPM | Alcohol Permeation | Relative Alcohol Permeation | Non-Alcohol Permeation | ESCA Carbon | % Fl$_2$ | % O$_2$ |
|---|---|---|---|---|---|---|---|
| 1 | <5 | >125 | ~600% | ~185 | 100 | 0 | 0 |
| 2 | <5 | 26.2 | 100% | 4.7 | 48.7% | 50.6% | 0.74% |
| 3 | 94 | 47.4 | 181% | 7.3 | 47.8 | 51.3 | 0.92 |
| 4 | 1,000 | 41.0 | 156% | 5.3 | 49.8 | 46.3 | 3.9 |
| 5 | 10,000 (1%) | 58.1 | 222% | 5.2 | 51.5 | 37.6 | 10.9 |
| 6 | 100,000 (10%) | 131.5 | 502% | 5.3 | 57.2 | 24.7 | 18.1 |
| 7 | 210,000 (Air) | 144.4 | 551% | 4.8 | 56.7 | 23.7 | 19.6 |
| 8 | 4% hydrogen | 18.5 | 70.6% | 4.7 | 50.7 | 48.1 | 1.27 | a - produced without the use of fluorine; untreated

This example confirms that the results for thick walled containers of Example 3 apply also to fluorination conditions common to the production of thin walled plastic containers. It also shows that the benefit of improved barrier performance towards aggressive permeants does not necessarily compromise the barrier towards the less aggressively permeating hydrocarbons. This example again shows that the benefit is not simply derived from preventing the incorporation of oxygen into the polymer barrier surface.

EXAMPLE 7

Effect of Hydrogen Quench on Barrier Properties of Bottles after Fluorine Treatment Several 16 ounce HDPE containers were prepared as in Example 3. Several inflation gases consisting of variable concentrations of fluorine in nitrogen blends at approximately 7.5 bar. After the fluorination treatment, purging of the containers was done using (1) 3 purge cycles of nitrogen (N) or (2) a blend of 1% hydrogen in nitrogen (H). After the final purge, the containers were vented to atmospheric pressure, the container removed and further purged as described in Example 3.

The quality of the resultant barriers were determined as in Example 3; however, the storage temperature was between 55° and 60° C. The results are listed in Table 5 below.

EXAMPLE 8

Effect of Hydrogen Quench on Barrier Properties of Polypropylene Bottles after Fluorine Treatment Several 16 ounce Polypropylene containers were prepared as in Example 3. During the parison extrusion the interior of the parison and the immediate environment was either purged with nitrogen to exclude air entrance or air was allowed access to the parison interior. The inflation gas used was 1 volume % fluorine in nitrogen containing less than 5 PPM of oxygen. The fluorine inflation at approximately 7.5 bar and hold time was 6 seconds. After the fluorination treatment, purging of the containers was done using 3 purge cycles of (1) nitrogen containing less than 5 PPM oxygen, or (2) a 1% hydrogen in nitrogen blend. The quench cycle inflation and hold time was 6 seconds. A 1.5 second exhaust time was used after each gas exposure. After the final quench, the containers were vented to atmospheric pressure, the mold opened, the container removed and further purged as described in Example 3. The quality of the resultant barrier to a 30% toluene and 70% hexanes mixture was determined. The results are given in Table 6 below.

TABLE 5

| Run | Fluorine Concentration | Purge | Weight Loss (grams) | Relative Permeation | Weight Loss measured at | Bottle Life Days | Relative Lifetime |
|---|---|---|---|---|---|---|---|
| 1 | 0.37% | N | 20.9 | 100% | @21 Days | 22+ | |
| 2 | 0.37% | H | 12.7 | 60.8 | @21 Days | 25+ | +14% |
| 3 | 0.48% | N | 17.7 | 100% | @21 Days | 23+ | |
| 4 | 0.48% | H | 16.1 | 91.0 | @21 Days | 28+ | +22% |
| 5 | 0.54% | N | 30.4 | 100% | @21 Days | 27+ | |
| 6 | 0.54% | H | 21.3 | 70.1 | @21 Days | 23+ | −15% |
| 7 | 0.54%[a] | N | 14.69 | 100% | @14 Days | 19+ | |
| 8 | 0.54%[a] | H | 14.38 | 98.0 | @14 Days | 24+ | +26% |
| 9 | 0.54%[b] | N | 23.1 | 100% | @21 Days | 23+ | |
| 10 | 0.54%[b] | H | 20.8 | 90.0 | @21 Days | 25+ | +9% |
| 11 | 1.0% | N | 30.3 | 100% | @14 Days | 20+ | |
| 12 | 1.0% | H | 28.2 | 93.7 | @14 Days | 27+ | +35% |
| 13 | 1.6%[c] | N | 115.5 | 100% | @21 Days | 25+ | |
| 14 | 1.6%[c] | H | 109.6 | 94.9 | @21 Days | 27+ | +8% |
| 15 | 2.1% | N | 10.1 | 100% | @6 days | Test Stopped | |
| 16 | 2.1% | H | 8.8 | 87.1 | @6 days | Test Stopped | |

[a]containers had poorer weight distribution
[b]fluorine blend container 100 ppm of oxygen
[c]fluorine blend container had 930 ppm of oxygen The value for the bottle life represents the time on testing before the first container failed by environmental stress cracking due to the contained mixture. The containers for Runs 7 and 8 (a) were manufactured with the same gas treatment as for Runs 5 and 6 but with a poor weight distribution leading to reduced stress crack resistance. Runs 9 and 10 used a fluorine blend containing 100 PPM of oxygen. For Runs 13 and 14 the fluorine in nitrogen blend contained 930 PPM of oxygen.

The results show that the use of the halogen scavenging gas, hydrogen, as a purge gas following fluorination results in improved barrier performance over the range of fluorine treatment concentrations. And, the application of the fluorine scavenging gas, hydrogen, as purge gas following fluorination results in improved environmental stress crack resistance under severe storage conditions.

TABLE 6

| Treatment | Parison | Hydrogen Quench or Nitrogen Purge | Permeation | Relative Permeation |
|---|---|---|---|---|
| Untreated | Air | Purge | 62.5 | 262% |
| Untreated | N | Purge | 64.7 | 178% |
| 1% Fluorine | Air | Purge | 23.9 | 100% |
| 1% Fluorine | Air | Quench | 22.2 | 93% |
| 1% Fluorine | N | Purge | 36.4 | 100% |
| 1% Fluorine | N | Quench | 27.3 | 75% |

This example shows that the phenomena of an improvement in barrier performance arising from the application of a fluorine scavenging gas is applicable to polypropylene.

EXAMPLE 9

Effect of Hydrogen and Ethylene as Quench Scavengers and Toxicity of Purge Gas for Fluorine Several 16 ounce HDPE containers were prepared as in Example 3; however, they were inflated to between 1.5 and 7 bar with 0.1 or 1 volume % fluorine in nitrogen (contaminated with oxygen) for 2.5 to 25 seconds. Three purge gases containing (1) nitrogen, (2) 1 volume % hydrogen in nitrogen and (3) 3 volume % ethylene in nitrogen purge gases were used to scavenge residual fluorine. The time for each purge cycle was approximately 2 seconds. After purging the residual gas content of the containers was sniffed, to determine if the odor of fluorine could be detected. All of the containers which were purged with nitrogen exhibited an odor of fluorine. None of the containers purged with nitrogen containing hydrogen, or nitrogen containing ethylene emitted such an odor, showing destruction of the more toxic fluorine.

EXAMPLE 10

Effect of Ammonia as Fluorine Quench on Toxicity of Purge Gas

Several 16 ounce HDPE containers were prepared as in Example 3 using a 1 vol % fluorine in nitrogen blend. However, they were purged using either a single nitrogen purge cycle, of approximately 6 seconds, or 1 ammonia purge cycle. All of the purge gases were supplied at approximately 7 bar.

The containers purged with ammonia as a quench gas contained a hygroscopic or deliquescent white powder (presumed to be a mixture of $NH_4F$ and $NH_4HF_2$) and emitted no odor of fluorine, showing destruction of the more toxic fluorine.

EXAMPLE 11

Effect of Sulfur Dioxide Hydrogen Quench on Toxicity of Purge Gas

Several 16 ounce HDPE containers were prepared as in Example 3 using a 1 volume % fluorine in nitrogen blend. However, they were purged using either 5 nitrogen purge cycles, of approximately 6 seconds per cycle, or one cycle of sulfur dioxide followed by four cycles of nitrogen. All of the purge gases were supplied at approximately 6 bar. The containers purged with sulfur dioxide displayed a pressure spike upon entry of the sulfur dioxide into the container showing destruction of the more toxic fluorine. The nitrogen purged parisons retained a slight fluorine level.

EXAMPLE 12

Effect of Hydrogen Quench on Parison Surface

Several 16 ounce HDPE containers were prepared as in Example 3 using gases at various low concentrations of fluorine in nitrogen. The purge gases used were either substantially contaminant free nitrogen (N), (1) 1% hydrogen in nitrogen (H), (2) 3% hydrogen in nitrogen ($H_2$) blends or (3) air (A). The surface roughness or smoothness was determined by measuring the surface glossy using a reflectometer at a 60 degree angle of incidence, and the surface atomic composition was determined by ESCA. The results are reported in Table 7.

TABLE 7

| Condition | Fluorine Conc. | Fluorine Time | Purge | Appearance | % Gloss | ESCA Carbon | Fluorine | Oxygen |
|---|---|---|---|---|---|---|---|---|
| Control | 0% |  | N | Glossy | 11.5 | 100 | 0 | 0 |
| 1 | 0.1% | 6 sec | N | Glossy | 13 | 54 | 45 | 1 |
| 2 | 0.1% | 6 | H | Glossy | 42.6 | 60 | 38 | 2 |
| 3 | 0.1% | 6 | H2 | Glossy | 56.6 | 82 | 17 | 1 |
| 4 | 0.1% | 6 | A | Glossy | 57 | 62 | 19 | 18 |
| 5 | 0.1% | 18 | N | Glossy | 18.8 | 55 | 42 | 3 |
| 6 | 0.1% | 18 | H | Glossy | 30.7 | 61 | 35 | 4 |
| 7 | 0.1% | 18 | 1% $O_2$ | Glossy | 35.3 | 62 | 18 | 20 |
| 8 | 0.1% | 18 | H2 | Glossy | 42.3 | 72 | 24 | 3 |
| 8 | 0.1% | 18 | A | Glossy | 43 | 62 | 19 | 19 |
| 9 | 0.37% | 6 | N | Matte | 2.5 | 45 | 54 | 1 |
| 10 | 0.37% | 6 | H | Matte | 4.5 | 50 | 49 | 0.5 |
| 11 | 0.37% | 6 | H2 | Glossy | 53 | 57 | 41 | 1 |
| 12 | 0.37% | 6 | A | Glossy | 34 | 58 | 22 | 22 |
| 13 | 0.5% | 6 | N | Matte | 2.1 | 45 | 54 | 1 |
| 14 | 0.5% | 6 | H | Matte | 2.5 | 47 | 52 | 1 |
| 15 | 0.5% | 6 | H2 | Glossy | 46 | 55 | 44 | 1 |
| 16 | 0.5% | 6 | A | Glossy | 63 | 58 | 22 | 20 |
| 17 | 0.5%[a] | 6 | N | Glossy | 65 | 59 | 25 | 16 |

[a]fluorine mixture contains approximately 9200 ppm of Oxygen

This example shows that with the use of a fluorine reactive quench it is possible to achieve a high level of surface reflectivity or smoothness without compromising the surface by incorporating oxygen. Runs 16 and 17, for example, show that substantially the same surface smoothness can be achieved by using a mixture of fluorine and oxygen during the fluorination, or by quenching the surface with an oxygen rich gas. Runs 13, 14 and 15 show that by use of a fluorine reactive quench gas one can obtain a surface of increasing smoothness, without a high level of oxygen contamination. Runs 6, 7, 8 and 9 show that under differing fluorine treatment and purge conditions one can obtain the equivalent surface smoothness while incorporating higher levels of fluorine and lower levels of oxygen.

Although not intending to be bound by theory, the use of a fluorine scavenging gas, particularly hydrogen, is believed to improve productivity and/or reduce worker health risk by converting the more toxic halogen and inter-halogen compounds into the less toxic, and more easily scrubbed, hydrogen halides. The halogen scavenging gas is believed to improve the mixed polar/non-polar solvent blend barrier performance by eliminating or competing with oxygen for the reactive sites in the polymer where oxygen might be incorporated. It also reacts with any available fluorine to form hydrogen fluoride, which is not reactive with the polymer surface, thereby preventing the formation of further reactive sites. It also may reduce the level or extent of cross-linking of the surface, leading to less surface roughness, which in turn reduces the totality of wetted surface area through which permeation can occur.

What is claimed is:

1. In a process for the production of a permeation resistant thermoplastic container wherein a thermoplastic material is formed into a container and at least the interior of the container fluorinated by contacting the surface with a fluorine containing gas under conditions sufficient to effect surface fluorination and thereby reduce the permeability of said container to organic fluids, and the container recovered, the improvement which resides in quenching the fluorination of said container by contacting the fluorine contained within the container with a fluorine reactive gas under conditions effective for converting the fluorine to a less reactive or less toxic by-product.

2. The process of claim 1 wherein the thermoplastic material is polyethylene or polypropylene.

3. The process of claim 2 wherein the fluorine reactive gas is a hydrogen donating gas.

4. The process of claim 3 wherein the fluorine reactive gas which is hydrogen donating is selected from the group consisting of hydrogen, ethane, ethylene, methane, sulfur dioxide, ammonia and is carried in an inert gas.

5. The process of claim 4 wherein the fluorine reactive gas is present in said amount of from 0.1 to 10% by volume and the balance is an inert gas and the fluorine reactive gas is added in at least a stoichiometric amount to react with the fluorine.

6. The process of claim 4 wherein the inert gas is selected from the group consisting of argon, helium, nitrogen and carbon dioxide.

7. The process of claim 6 wherein the fluorine reactive gas is hydrogen.

8. The process of claim 7 wherein the container is purged with a hydrogen containing gas prior to contacting the container with said fluorine containing gas and effecting surface fluorination thereof.

9. The process of claim 2 wherein the fluorination of said container is done by an in line blow molding process.

10. The process of claim 2 wherein the fluorine reactive gas is introduced at a temperature below that of the container.

11. The process of claim 10 wherein the container is subjected to multiple fluorinations.

12. In a process for the production of a blow molded permeation resistant thermoplastic article via in-line fluorination wherein a parison of thermoplastic material is formed under conditions so as to minimize the exposure of the parison interior to oxygen contamination, expanded within a closed mold by means of an inert inflation gas for conforming the parison to the shape of the mold and fluorinated under conditions sufficient to effect surface fluorination of the interior of the parison thereby reducing its permeability to hydrocarbon mixtures, evacuated and the resulting blow molded permeation resistant thermoplastic article recovered, the improvement which resides in an in-line multi-step fluorination process which comprises contacting the interior of the parison with hydrogen prior to the contacting the interior of the parison with said fluorine containing gas and then contacting the interior of the parison with a fluorine reactive gas after fluorination to remove residual fluorine.

13. The process of claim 12 wherein the thermoplastic material is selected from the group of polymers consisting of polyethylene, polypropylene, butadiene, polystyrene or nylon.

14. The process of claim 13 wherein the fluorine reactive gas is selected from the group consisting of hydrogen, deuterium, hydrogen bearing species having three or fewer carbon atoms, sulfur dioxide and ammonia.

15. The process of claim 14 wherein the fluorine reactive gas is present in an amount to provide a partial pressure of from 0.1 to 600 millibars and the fluorine reactive gas is added in at least a stoichiometric amount to react with the fluorine.

16. The process of claim 15 wherein the fluorine containing gas also contains oxygen.

17. The process of claim 12 the interior of the parison is subjected to an inert gas flow or a decrease in pressure so as to remove a substantial portion of the residual fluorine containing gas prior to introducing the fluorine reactive gas.

* * * * *